(12) United States Patent
Arya

(10) Patent No.: US 12,522,108 B2
(45) Date of Patent: Jan. 13, 2026

(54) METHOD OF COUNTERACTING DEGRADATION OF A FUEL CELL SYSTEM OF A VEHICLE

(71) Applicant: Volvo Truck Corporation, Gothenburg (SE)

(72) Inventor: Pranav Arya, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/878,205

(22) PCT Filed: Jun. 27, 2022

(86) PCT No.: PCT/EP2022/067628
§ 371 (c)(1),
(2) Date: Dec. 23, 2024

(87) PCT Pub. No.: WO2024/002464
PCT Pub. Date: Jan. 4, 2024

(65) Prior Publication Data
US 2025/0170923 A1      May 29, 2025

(51) Int. Cl.
*B60L 58/30* (2019.01)
*B60L 1/00* (2006.01)
(Continued)

(52) U.S. Cl.
CPC .............. *B60L 58/30* (2019.02); *B60L 1/003* (2013.01); *B60L 53/54* (2019.02); *B60L 58/12* (2019.02);
(Continued)

(58) Field of Classification Search
CPC .......... B60L 58/30; B60L 58/33; B60L 50/75; B60L 58/12; H02J 3/32; H01M 8/043;
(Continued)

(56) References Cited

U.S. PATENT DOCUMENTS

| 2005/0008904 A1 | 1/2005 | Suppes |
| 2011/0087389 A1 | 4/2011 | Burleigh et al. |

(Continued)

FOREIGN PATENT DOCUMENTS

| CN | 109606203 A | 4/2019 | |
| CN | 105280935 B * | 6/2019 | ................ B60L 1/00 |

(Continued)

OTHER PUBLICATIONS

International Search Report and Written Opinion of the International Searching Authority, PCT/EP2022/067628, mailed Feb. 17, 2023, 14 pages.

(Continued)

*Primary Examiner* — Yuri Kan
(74) *Attorney, Agent, or Firm* — Sage Patent Group

(57) ABSTRACT

The present disclosure relates to a method of counteracting degradation of a fuel cell system of a vehicle. A processor device is used for performing the method. The processor device estimates a standstill average power needs of the vehicle by estimating the average power that the vehicle will consume during a predetermined time period during which the vehicle will be at a standstill. An idling power extractable from the fuel cell system is determined. Said idling power is compared with said estimated standstill average power needs. Based on the comparison, a duration for which the fuel cell system should be kept turned on to fulfil said estimated standstill average power needs is determined. The fuel cell system is controlled to be kept turned on for the determined duration.

12 Claims, 5 Drawing Sheets

(51) Int. Cl.
*B60L 53/54* (2019.01)
*B60L 58/12* (2019.01)
*H01M 8/04955* (2016.01)
*H01M 10/44* (2006.01)
*H01M 16/00* (2006.01)

(52) U.S. Cl.
CPC ..... *H01M 8/04955* (2013.01); *H01M 10/441* (2013.01); *H01M 16/006* (2013.01); *B60L 2260/22* (2013.01); *H01M 2250/20* (2013.01); *H01M 2250/402* (2013.01)

(58) Field of Classification Search
CPC ......... H01M 8/04231; H01M 8/04992; H01M 8/04955; B64C 29/0008
See application file for complete search history.

(56) References Cited

U.S. PATENT DOCUMENTS

| | | | |
|---|---|---|---|
| 2012/0070758 A1* | 3/2012 | Odashima | ......... H01M 8/04992 429/444 |
| 2012/0171585 A1 | 7/2012 | Mueller et al. | |
| 2012/0301803 A1 | 11/2012 | Wake et al. | |
| 2018/0175416 A1* | 6/2018 | Kim | .................. H01M 8/04231 |
| 2022/0166042 A1* | 5/2022 | Braun | .................... H01M 8/043 |
| 2022/0293976 A1* | 9/2022 | Lee | ....................... H01M 8/043 |
| 2023/0312134 A1* | 10/2023 | Kano | .................. B64C 29/0008 320/107 |
| 2024/0243608 A1* | 7/2024 | Gutknecht | ................ H02J 3/32 |

FOREIGN PATENT DOCUMENTS

| | | | | |
|---|---|---|---|---|
| CN | 110861538 A | | 3/2020 | |
| CN | 111002873 A | | 4/2020 | |
| CN | 111055728 A | | 4/2020 | |
| DE | 102012216617 B4 | * | 3/2020 | ............. B60L 58/12 |
| JP | 2022-519999 A1 | | 3/2022 | |

OTHER PUBLICATIONS

International Preliminary Report on Patentability of the International Preliminary Examining Authority, PCT/EP2022/067628, mailed Apr. 15, 2024, 8 pages.

Korean Office Action and English Translation, Korean Application No. 10-2024-7042676, mailed Apr. 1, 2025, 10 pages.

* cited by examiner

METHOD OF COUNTERACTING DEGRADATION OF A FUEL CELL SYSTEM OF A VEHICLE

CROSS REFERENCE TO RELATED APPLICATIONS

This application is a 35 U.S.C. § 371 national stage application of PCT International Application No. PCT/EP2022/067628 filed on Jun. 27, 2022, the disclosure and content of which is incorporated by reference herein in its entirety.

TECHNICAL FIELD

The present disclosure relates to a method of counteracting degradation of a fuel cell system of a vehicle. The present disclosure also relates to a vehicle comprising a processor device to perform said method. The present disclosure further relates to a computer program, to a non-transitory computer-readable storage medium, and to a control unit configured to perform said method.

The teachings of the present disclosure can be applied in heavy-duty vehicles, such as trucks, buses and construction equipment. Although the focus of the present disclosure will be with respect to a heavy-duty vehicle such as a truck, the general teachings herein are not restricted to this particular vehicle, but may also be implemented for other vehicles such as cars.

BACKGROUND

For fuel cell electric vehicles (FCEVs), in certain situations, there may be a power request from the vehicle even when the vehicle is parked. These requests may typically be for heating or cooling of the cab when the driver is living in the vehicle or for operating power take-off device such as a fridge. Other long term standstill scenarios may be when the vehicle is used for performing a working operation, for example at a construction site or the like. For instance, the power request at vehicle standstill may be for operating a power teak-off device such as a crane, a concrete mixer, etc.

FCEVs generally have rather small batteries. Non-optimal management for long term standstill scenarios can lead to multiple start-ups of the fuel cell system, which is degrading for the health of the fuel cell system (if the battery is depleted while fulfilling the power needs, then the fuel cell system needs to start up). It would be desirable to reduce the risk of degradation of fuel cell systems.

SUMMARY

An object of the present disclosure is to provide a method which at least partly alleviates the above mentioned degradation problem. This and other objects which will become apparent in the following discussion are achieved by a method according to claim 1. Some non-limiting exemplary embodiments are presented in the dependent claims.

According to a first aspect of the present disclosure, there is provided a method of counteracting degradation of a fuel cell system of a vehicle, the method comprising:
estimating, by a processor device of a computing system, standstill average power needs of the vehicle by estimating the average power that the vehicle will consume during a predetermined time period during which the vehicle will be at a standstill,
determining, by the processor device, an idling power extractable from the fuel cell system,
comparing, by the processor device, said idling power with said estimated standstill average power needs,
determining, by the processor device, based on the comparison, a duration for which the fuel cell system should be kept turned on to fulfil said estimated standstill average power needs, and
controlling, by the processor device, the fuel cell system to be kept turned on for the determined duration.

By comparing the idling power with estimated standstill average power needs of the vehicle, the duration for which the fuel cell system should be kept on can be determined, thereby avoiding too early shut-downs and subsequent start-ups. Thus, over time, the number of start-ups can be reduced and therefore the risk of degradation of the fuel cell system can also be reduced Similarly, to internal combustion engines which are configured to provide an idling power when the engine is turned on, the fuel cell system of an FCEV also has an idling power, which can thus be regarded as a minimum power in a turned-on state of the fuel cell system.

As will be discussed in more detail below, in some exemplary embodiments the FCEV may be provided with a battery which can be charged by means of power provided by the fuel cell system. However, in other exemplary embodiments, the FCEV does not have a battery which can be charged by the fuel cell system. In the latter case, the estimated standstill average power need should be higher than the idling power provided by the fuel cell system. In other words, the estimated average power that the vehicle will consume during said predetermine time period during which the vehicle will be at a standstill should be greater than said idling power. Otherwise the when the fuel cell system is running at idling power there will be an overproduction and waste of power. However, in the first case, i.e. when a battery can be charged by the fuel cell system, even though the power request from the vehicle is lower than the idling power, the idling power may be used for charging the battery if possible. Thus, the standstill average power need (i.e. including charging of battery) may be higher than the idling power even though the power request from other vehicle components is low.

The predetermined time period mentioned above may, in at least some exemplary embodiments, be the entire period before the vehicle starts to move again along the ground. For instance, in hoteling scenarios, such as an overnight stay, in which the driver parks the vehicle, sleeps in the vehicle, and in the morning starts the vehicle to continue driving, said predetermined time period may be for the entire stay. Nevertheless, in some exemplary embodiments, it may be advantageous to split the period of standstill into two or more predetermined time periods. For instance, if large temperature differences can be expected at different time periods during the stay, for instance a large outside temperature drop is expected during night hours, affecting the heating power request, it may be appropriate to make one power consumption estimation for a first period and another power consumption estimation for a second period following the first period. Similar consideration may be made at a work site. Although the vehicle will be at a long term standstill, during a first predetermined time period a power take-off device (such as a crane, etc.) may be expected to do a certain operation which may require a certain power, while a later operation, or non-operation, during the standstill may call for another power level. As the vehicle may be provided with various power take-off devices and auxiliary devices that may require power at different points in time and/or at different power levels, the processor device used in the method may suitably estimate/calculate an average power need based on the different requests during the predetermined time period, i.e. the processing device may estimate/calculate said standstill average power need.

The predetermined time period may suitably be defined in different conceivable ways. According to at least some exemplary embodiments, the predetermined time period may be defined by the manual input from the driver. For instance, the driver may enter the number of hours that the vehicle is expected to be at a standstill, such as parked for an overnight stay. However, the predetermined time period may also be based on historical events, such as machine learning etc. For instance, if a vehicle at a construction site in performing a certain operation, such as mixing concrete, based on previous corresponding events, the processor device of the vehicle may define the predetermined time period.

As already indicated above, it may be advantageous to take into account ambient conditions when estimating the standstill average power needs. As also mentioned, different devices are expected to consume different amounts of power, and may suitably be considered to estimate the standstill average power needs. Taking into account such factors is at least partly reflected in at least one exemplary embodiment, according to which the estimation of the standstill average power needs is based on one or more of:
  expected ambient conditions, such as outside temperature values, during said predetermined time period,
  expected power consumption of turned on auxiliary devices, such as air-conditioning system and fridge, during said predetermined time period,
  historical data on power consumption of auxiliary devices,
  expected power consumption of one or more power take-off devices during said predetermined time period,
  historical data on power consumption of one or more power take-off device.

According to at least one exemplary embodiment, the vehicle comprises a battery pack having one or more batteries, the battery pack being chargeable by the fuel cell system, the method further comprising:
  determining, by the processor device, the state of charge of the battery pack, wherein said determining of the duration for which the fuel cell system should be kept turned on to fulfil said estimated standstill average power needs is also based on the determined state of charge of the battery pack.

By letting the processor device determine the state of charge of the battery pack, it can calculate how the fuel system should be used. For instance, if the fuel cell system can be maintained at idling power (or higher power) to fulfil the standstill average power needs while charging the battery pack for the entire predetermined time period, the fuel cell system may advantageously be kept turned on for the whole predetermined time period, thereby avoiding restarting the fuel cell system However, if the calculations of the processor device show that too much power is provided from the fuel cell system and the battery pack is not large enough to store all of it, then the processor device may limit the duration for which the fuel cell system is kept turned on.

According to at least one exemplary embodiment, if, based on the comparison it is determined that:
  the idling power is lower than said estimated standstill average power needs, then the method further comprises controlling, by the processor device, the fuel cell system to run at a power level greater than said idling power so as to fulfil said estimated standstill average power needs,
  the idling power is higher than the estimated standstill average power needs of the vehicle, then the method further comprises controlling, by the processor device, the fuel cell system to be kept turned on at said idling power so as to fulfil said estimated standstill average power needs.

Thus, if the processor device discovers that the idling power is insufficient to fulfil the estimated standstill average power needs, it may control the fuel system to run at a higher power level so that the standstill average power needs are met. On the other hand if the idling power is higher than the standstill average power needs any excess power may suitably be used for charging a battery pack, as will be exemplified below. The battery pack can be regarded as a buffer, which is why the average power needs is a suitable measure. For example, if the power need for the next 5 minutes is 5 kW, and the idling power is 10 kW, then the remaining 5 kW may go to the battery pack. After that, for the next 5 minutes, the power need may go up to 15 kW, but the idling power will still be 10 kW as the average power need for the 10 minute span is 10 kW. The additional 5 kW power need for the latter 5 minutes will then be fulfilled by the battery pack which hence acts as a buffer.

According to at least one exemplary embodiment, if, based on the comparison, it is determined that the idling power is higher than the estimated standstill average power needs of the vehicle, then the method further comprises:
  calculating, by the processor device, an average excess power, the average excess power being the difference between the idling power and the estimated standstill average power needs,
  determining, by the processor device, based on the state of charge and capacity of the battery pack, whether or not the calculated average excess power for the entire duration of said predetermined timed period can be used to charge the battery pack. This is advantageous as this allows for the possibility to keep the fuel cell system turned on and avoid unwanted restarting thereof if the state of charge and capacity of the battery pack is such that the battery pack can store the excess power.

According to at least one exemplary embodiment, if it is determined that the calculated average excess power:
  can be used to charge the battery pack for the entire duration of said predetermined time period, then the method comprises controlling, by the processor device, the fuel cell system to be kept turned on at said idling power to fulfil the estimated standstill average power needs of the vehicle while charging the battery pack with said excess average power,
  cannot be used to charge the battery pack for the entire duration of said predetermined time period, then the method comprises determining, by the processor device, whether or not the current state of charge of the battery pack is sufficient for fulfilling the estimated standstill average power needs of the vehicle for the entire duration of said predetermined time period.

Again, the processor device may advantageously determine to make use of the excess power by charging the battery pack if the battery pack can store such excess power. However, if the fuel cell system provides more power than what can be stored by the battery pack, the fuel cell system will need to be shut down to avoid wasting energy. Nevertheless, the processor device may before simply shutting down the fuel cell system consider the current state of charge, and calculate whether or not the state of charge is sufficient for fulling the estimated average power needs or if the fuel cell system should run for at least part of the duration of said predetermined time period. Thus, the capacity and current state of the charge may on the one hand be such that the battery pack cannot store all the excess power, but on the other hand the state of charge may at the same time be too low for fulfilling the standstill average power needs on its own.

According to at least one exemplary embodiment, if it is determined that the current state of charge of the battery pack:
- is sufficient for fulfilling the estimated standstill average power needs of the vehicle for the entire duration of said predetermined time period, then the method comprises controlling, by the processor device, the fuel cell system to be turned off and controlling, by the processor device, the battery pack to provide the estimated standstill average power needs,
- is insufficient for fulfilling the estimated standstill average power needs of the vehicle for the entire duration of said predetermined time period, then the method comprises determining, by the processor device, whether or not the battery pack would be able to fulfil the estimated standstill average power needs if it would be fully charged. This is advantageous as the processor device may calculate whether or not the battery pack on its own can fulfil the power needs or if it should be supported by the fuel cell system. For instance, if the processor device calculates that a certain higher state of charge would suffice to fulfil the power needs, than the fuel cell system may suitably run to charge the battery pack to said certain higher state of charge. In particular, the fuel cell system may suitably be controlled to run to fully charge the battery pack, and then be turned off.

According to at least one exemplary embodiment, if it is determined that:
- the battery pack would be able to fulfil the estimated standstill average power needs if it would be fully charged, then the method comprises controlling, by the processor device, the fuel cell system to charge the battery pack fully and then controlling, by the processor device, the fuel cell system to be shut down,
- the battery pack would be unable to fulfil the estimated standstill average power needs if it would be fully charged, then the method comprises calculating, by the processor device, a duration for which the fuel cell system needs to run and to what level the battery pack should be charged to fulfil the estimated standstill average power needs, and then controlling, by the processor device, the fuel cell system to run for the calculated duration to charge the battery pack to the calculated level and then controlling, by the processor device, the fuel cell system to be shut down.

Thus, in some cases the processor device may calculate that even if the battery pack could be charged until it is full, it would still not be sufficient to fulfil the power needs. In such cases, the processor device may control the fuel cell system to keep charging the battery pack for a sufficient time so that the power needs can be fulfilled by the battery pack.

According to a second aspect of the present disclosure, there is provide a vehicle comprising the processor device to perform the method of the first aspect, including any exemplary embodiment thereof. The advantages of the vehicle of the second aspect are largely analogous to the advantages of the method of the first aspect, including any exemplary embodiments thereof.

According to a third aspect of the present disclosure, there is provided a computer program comprising program code for performing, when executed by the processor device, the method of the first aspect, including any exemplary embodiment thereof. The advantages of the computer program of the third aspect are largely analogous to the advantages of the method of the first aspect, including any exemplary embodiment thereof.

According to a fourth aspect of the present disclosure, there is provided a non-transitory computer-readable storage medium comprising instructions, which when executed by the processor device, cause the processor device to perform the method of the first aspect, including any exemplary embodiments thereof. The advantages of the non-transitory computer-readable storage medium of the fourth aspect are largely analogous to the method of the first aspect, including any exemplary embodiment thereof.

According to a fifth aspect of the present disclosure, there is provided a control unit for counteracting degradation of a fuel cell system of a vehicle, the control unit being configured to perform the method of the first aspect, including any exemplary embodiment thereof. The advantages of the control unit of the fifth aspect are largely analogous to the advantages of the method of the first aspect, including any exemplary embodiment thereof.

The herein described control unit and/or processor device may include a microprocessor, microcontroller, programmable digital signal processor or another programmable device. The control unit and/or processor device may also, or instead, include an application specific integrated circuit, a programmable gate array or programmable array logic, a programmable logic device, or a digital signal processor. Where it includes a programmable device such as the microprocessor, microcontroller or programmable digital signal processor mentioned above, the processor may further include computer executable code that controls operation of the programmable device.

Generally, all terms used in the claims are to be interpreted according to their ordinary meaning in the technical field, unless explicitly defined otherwise herein. All references to "a/an/the part, element, apparatus, component, arrangement, device, means, step, etc." are to be interpreted openly as referring to at least one instance of the part, element, apparatus, component, arrangement, device, means, step, etc., unless explicitly stated otherwise. The steps of any method disclosed herein do not have to be performed in the exact order disclosed, unless explicitly stated. Further features of, and advantages with, the present inventive concept will become apparent when studying the appended claims and the following description. The skilled person realizes that different features of the present inventive concept may be combined to create embodiments other than those described in the following, without departing from the scope of the present inventive concept.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
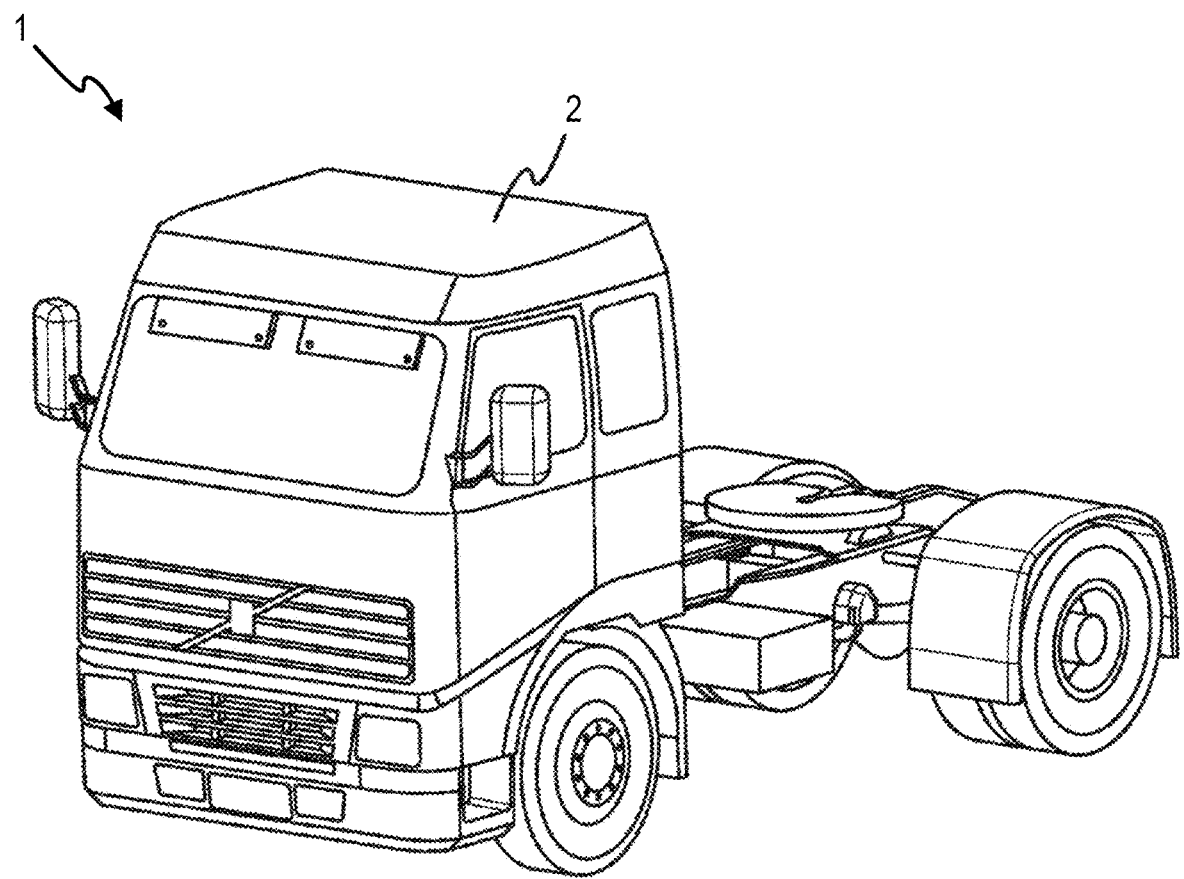
FIG. 1 illustrates a vehicle for which the method of the present disclosure may be implemented.

The general inventive concept will now be described more fully hereinafter with reference to the accompanying drawings, in which certain aspects of the inventive concept are shown. The inventive concept may, however, be embodied in many different forms and should not be construed as limited to the embodiments and aspects set forth herein; rather, the embodiments are provided by way of example so that this disclosure will be thorough and complete, and will fully convey the scope of the invention to those skilled in the art. Accordingly, it is to be understood that the general inventive concept is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 for which the method of the present disclosure may be implemented. In this example, the vehicle 1 is a heavy-duty vehicle in the form of a tractor unit. The tractor unit may be powered by a fuel cell system. Although a tractor unit has been illustrated, it should be understood that the teachings of the present disclosure may also be implemented in other types of vehicles, such as busses, construction equipment and passenger cars. The illustrated vehicle 1 comprises a cabin 2 in which a driver may operate the vehicle 1. Furthermore, the cabin 2 may also be provided with living, resting and sleeping facilities when the vehicle 1 is not driven. For instance, the cabin 2 may be provided with a bed, allowing a driver to sleep in the cabin 2. Furthermore, the cabin 2 may be provided with power-consuming appliances such as a fridge, a microwave oven, a television, heating/cooling system, etc. In other exemplary vehicles, there may be provided other power take-off devices, for example external equipment, such as cranes, mixers, etc. The above-exemplified devices, appliances, etc. may request power even when the vehicle 1 is not driven along a road, for example when the driver needs to rest or sleep, or using an external power take-off device at a working site while the vehicle 1 is at a standstill. The present disclosure provides a method which reduces the number of repeated re-starts of the fuel cell system that are otherwise traditionally performed during such prolonged standstill occasions.

Figure 2:
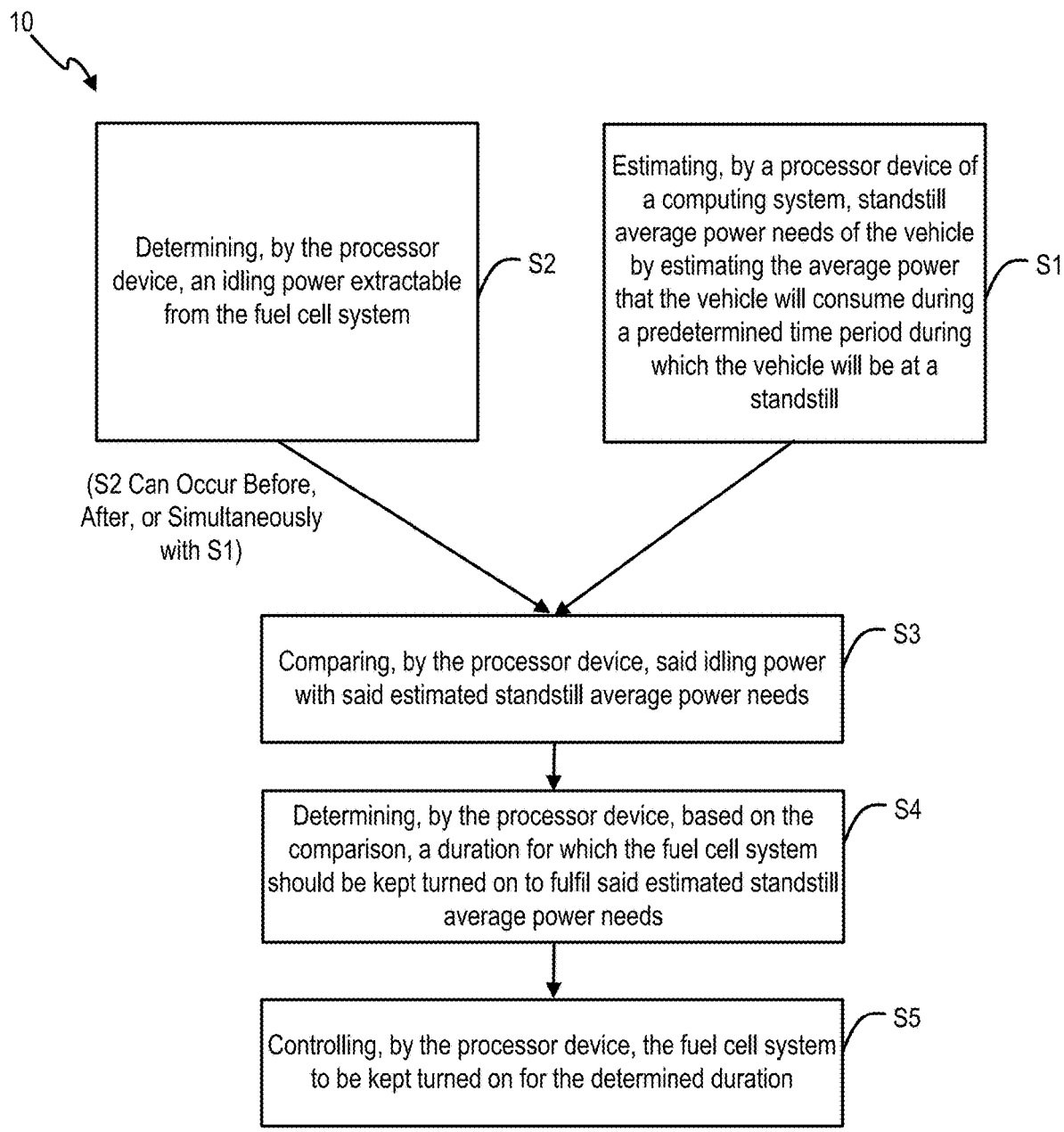
FIG. 2 illustrates schematically a method according to at least one exemplary embodiment of the present disclosure.

FIG. 2 illustrates schematically a method 10 according to at least one exemplary embodiment of the present disclosure. More specifically, FIG. 2 illustrates a method 10 of counteracting degradation of a fuel cell system of a vehicle (such as the vehicle 1 in FIG. 1), the method 10 comprising:

in a step S1, estimating, by a processor device of a computing system, standstill average power needs of the vehicle by estimating the average power that the vehicle will consume during a predetermined time period during which the vehicle will be at a standstill, in a step S2, determining, by the processor device, an idling power extractable from the fuel cell system, in a step S3, comparing, by the processor device, said idling power with said estimated standstill average power needs, in a step S4, determining, by the processor device, based on the comparison, a duration for which the fuel cell system should be kept turned on to fulfil said estimated standstill average power needs, and in a step S5, controlling, by the processor device, the fuel cell system to be kept turned on for the determined duration.

It should be understood that the above steps do not need to be performed in the listed order. For instance, the idling power determined in step S2 may be available as a stored value in an electronic memory. The idling power can thus be determined (step S2) before, after or simultaneously with the estimation (step S1) of the standstill average power needs.

Figure 3:
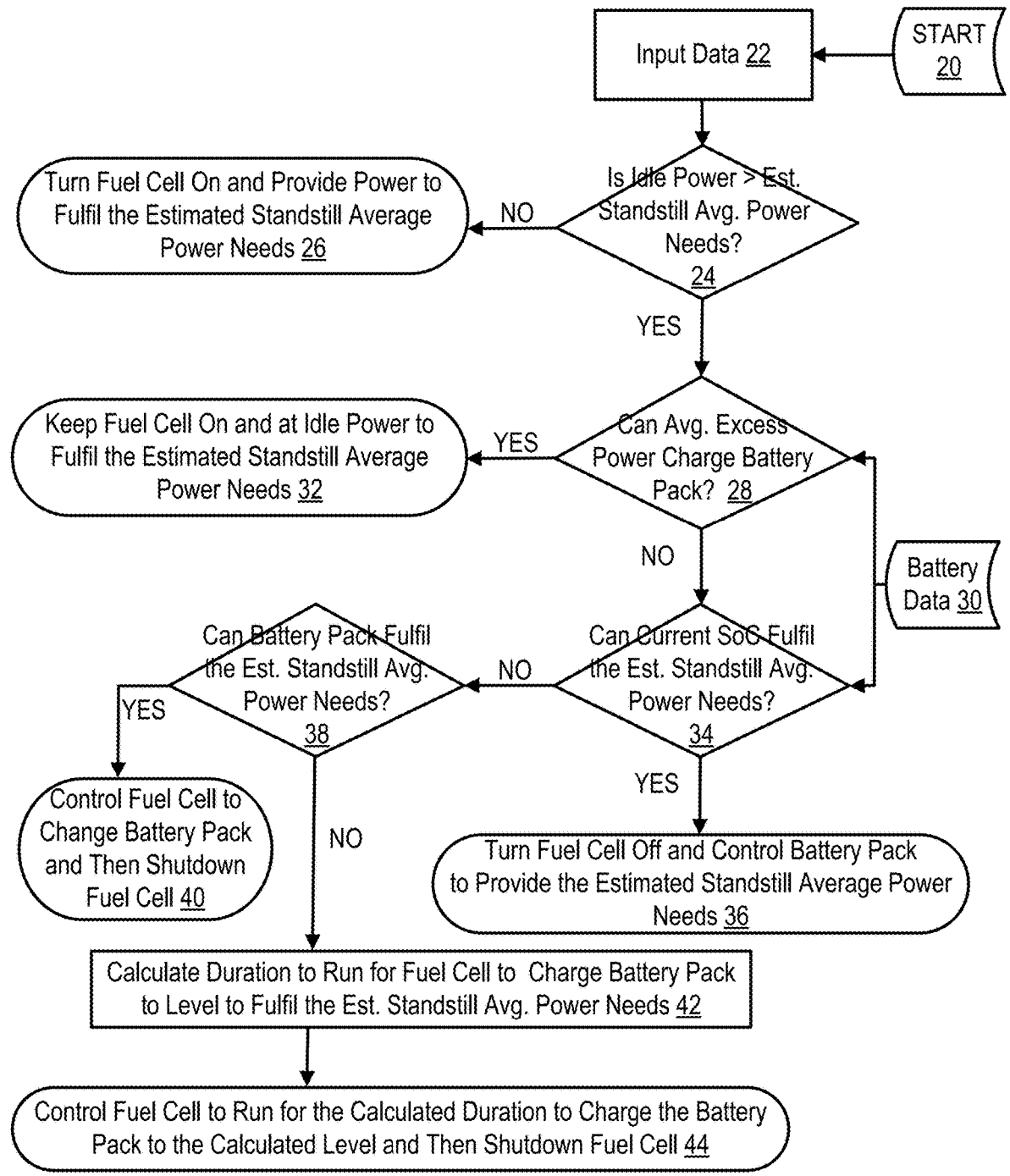
FIG. 3 is a flow chart which illustrates implementation of various exemplary embodiments of the method of the present disclosure.

FIG. 3 is a flow chart which illustrates implementation of various exemplary embodiments of the method of the present disclosure. Starting with box 20, it may represent input data, based on which the estimation of the standstill average power is made in box 22. The input data may, for example, be one or more of:

expected ambient conditions, such as outside temperature values, during said predetermined time period, expected power consumption of turned on auxiliary devices, such as air-conditioning system and fridge, during said predetermined time period, historical data on power consumption of auxiliary devices, expected power consumption of one or more power take-off devices during said predetermined time period, historical data on power consumption of one or more power take-off device.

In box 22, a processor device of a computing system, may estimate that standstill average power needs of the vehicle by estimating the average power that the vehicle will consume during a predetermined time period during which the vehicle will be at a standstill. As already explained previously, the predetermined time period may, for example be a time period during which the vehicle will be parked, or a time period during which devices of the vehicle will be used at a work site while the vehicle is at a standstill, etc.

The idling power extractable from the fuel cell system is normally predefined and known. It may, for instance, be stored and retrievable from an electronic memory by the processor device. In box 24 the processor device compares the idling power with the standstill average power needs that have been estimated in box 22. In particular, the processor device determines whether or not the idling power of the fuel cell system is greater than the standstill average power needs. If the answer is no, then the processor device decides to proceed with box 26. In box 26, the processor device controls the fuel cell system to be turned on and provide power at a level (greater than the idling power) which fulfils the estimated standstill average power needs of the vehicle. However, if the answer is yes, then the processor device proceeds to box 28. Before discussing box 28 in more detail, it suffice to state that it relates to a battery pack which may be provided on the vehicle.

Thus, as indicated above, the vehicle may comprise a battery pack having one or more batteries, the battery pack being chargeable by the fuel cell system. In box 30 the processor device may determine the state of charge of the battery pack, and suitably also the capacity of the battery pack. Such battery data may then be used by the processor device as input when determining the duration for which the fuel cell system should be kept turned on to fulfil the estimated standstill average power needs.

Continuing with box 28, which has been reached if the idling power is higher than the estimated standstill average power needs of the vehicle, now the processor device may control the fuel cell system to be kept turned on at the idling power so as to fulfil the estimated standstill average power needs. Furthermore, in box 28, the processor device may calculate an average excess power, the average excess power being the difference between the idling power and the estimated standstill average power needs. Based on that calculation and the battery data (state of charge and capacity) which is input from box 30, the processor device may determine whether or not the average excess power for the entire duration of said predetermined time period can be used to charge the battery pack. If the answer is yes, the processor device proceed to box 32. If the answer is no, the processor device proceeds to box 34.

In box 32, when the processor device has determined that the calculated average excess power can be used to charge the battery pack for the entire duration of said predetermined time period, the processor device may control the fuel cell system to be kept turned on at said idling power to fulfil the estimated standstill average power needs of the vehicle while charging the battery pack with said excess average power.

In box 34, when the processor device has determined that the calculated average excess power cannot be used to charge the battery pack for the entire duration of said predetermined time period, then the processor device may determine whether or not the current state of charge of the battery pack is sufficient for fulfilling the estimated standstill average power needs of the vehicle for the entire duration of said predetermined time period. Battery data (state of charge and capacity) is input from box 30. In this connection it should be noted that a minimum state of charge and power availability in the battery pack may be required for the start-up of the fuel cell system and this should suitably be ensured and considered in the calculations performed in box 34. If the processor device determines that the current state of charge of the battery pack is sufficient for fulfilling the estimated standstill average power needs of the vehicle for the entire duration of said predetermined time period, then the processor device proceeds to box 36. In box 36, the processor device turns off the fuel cell system and controls the battery pack to provide the estimated standstill average power needs. However, if the processor device determines that the current state of charge of the battery pack is insufficient for fulfilling the estimated standstill average power needs of the vehicle for the entire duration of said predetermined time period, then the processor device proceeds to box 38.

In box 38, the processor device determines whether or not the battery pack would be able to fulfil the estimated standstill average power needs if it would be fully charged. If the answer is yes, the procedure proceeds to box 40. If the answer is no, the procedure proceeds to box 42.

In box 40, the processor device controls the fuel cell system to charge the battery pack fully and then controls the fuel cell system to be shut down.

In box 42, the processor device calculates a duration for which the fuel cell system needs to run an to what level the battery pack should be charged to fulfil the estimated standstill average power needs, and then proceeds to box 44, in which the processor device may control the fuel cell system to run for the calculated duration to charge the battery pack to the calculated level and then may control the fuel cell system to be shut down.

Figure 4:
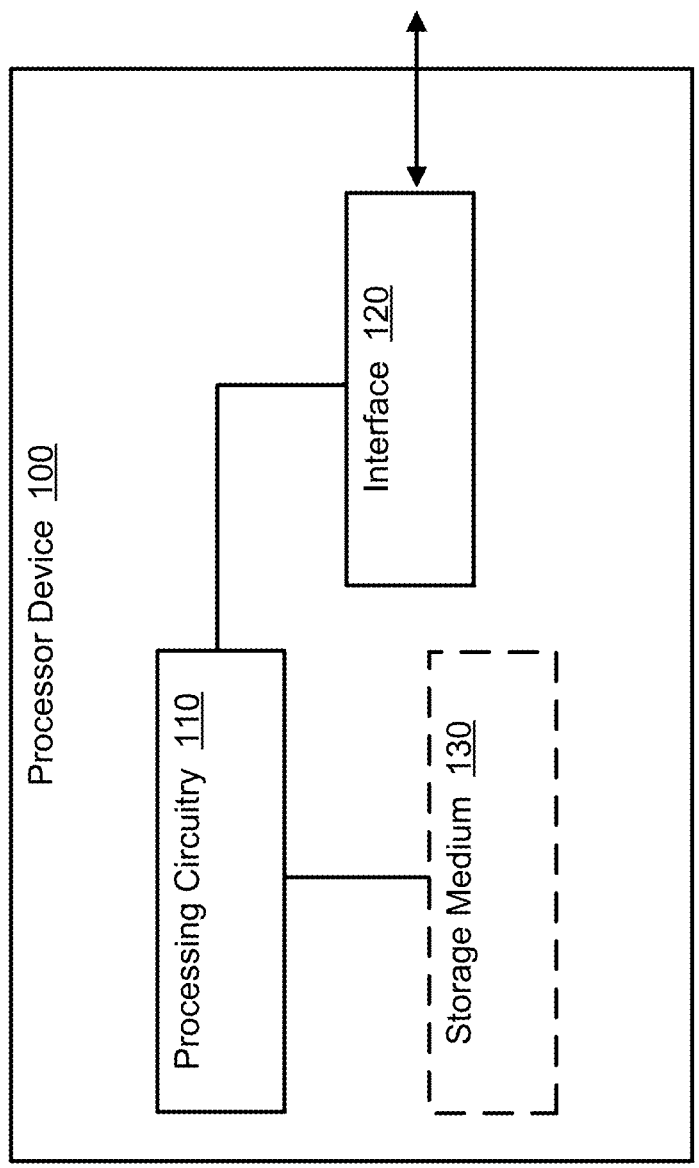
FIG. 4 schematically illustrates a control unit according to at least one exemplary embodiment of the present disclosure.

FIG. 4 schematically illustrates a processor device 100 according to at least one exemplary embodiment of the present disclosure. In other exemplary embodiments, FIG. 4 may instead represent a control unit according to the fifth aspect discussed above.

Thus, FIG. 4 illustrates, in terms of a number of functional units, the components of a processor device 100 according to exemplary embodiments of the discussions herein. The processor device 100 may be comprised in any system and vehicle disclosed herein, such as the one illustrated in FIG. 1. Processing circuitry 110 may be provided using any combination of one or more of a suitable central processing unit CPU, multiprocessor, microcontroller, digital signal processor DSP, etc., capable of executing software instructions stored in a computer program product, e.g. in the form of a storage medium 130. The processing circuitry 110 may further be provided as at least one application specific integrated circuit ASIC, or field programmable gate array FPGA.

Particularly, the processing circuitry 110 is configured to cause the processor device 100 to perform a set of operations, or steps, such as the method discussed in connection to FIG. 2 and exemplary embodiments thereof discussed throughout this disclosure, and or such as the procedure represented by the flow chart in FIG. 3. For example, the storage medium 130 may store the set of operations, and the processing circuitry 110 may be configured to retrieve the set of operations from the storage medium 130 to cause the processor device 100 to perform the set of operations. The set of operations may be provided as a set of executable instructions. Thus, the processing circuitry 110 is thereby arranged to execute exemplary methods as herein disclosed.

The storage medium 130 may also comprise persistent storage, which, for example may be any single one or combination of magnetic memory, optical memory, solid state memory or even remotely mounted memory.

The processor device 100 may further comprise an interface 120 for communications with at least one external device such as a battery pack for acquiring battery data such as state of charge and/or capacity and/or for controlling the power supply from the battery pack, a fuel cell system for controlling the power supplied from the fuel cell system, one or more power take-off devices for estimating power needs of said power take-off devices, a thermometer for acquiring outside temperature values, etc. as understood from previous discussions in herein. As such, the interface 120 may comprise one or more transmitters and receivers, comprising analogue and digital components and a suitable number of ports for wireline or wireless communication.

The processing circuitry 110 controls the general operation of the processor device 100, e.g. by sending data and control signals to the interface 120 and the storage medium 130, by receiving data and reports from the interface 120, and by retrieving data and instructions form the storage medium 130. Other components, as well as the related functionality, of the processor device 100 are omitted in order not to obscure the concepts presented herein.

Figure 5:
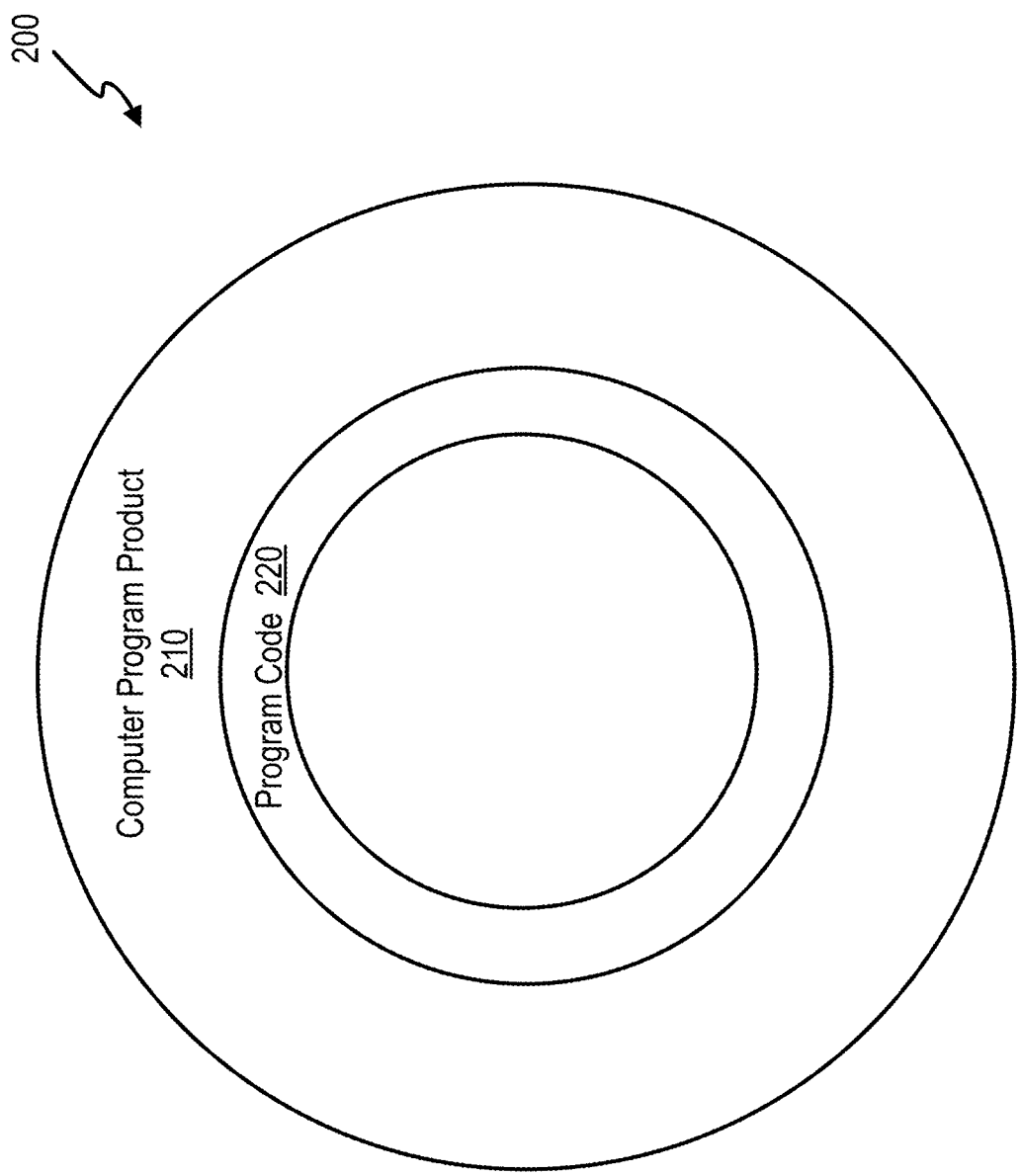
FIG. 5 schematically illustrates a computer program product according to at least one exemplary embodiment of the present disclosure.

FIG. 5 schematically illustrates a computer program product 200 according to at least one exemplary embodiment of the present disclosure. More specifically, FIG. 5 illustrates a computer-readable storage medium 210 comprising instructions (e.g. as programme code 220), which when executed by the processor device, cause the processor device to perform the method exemplified in FIG. 2 and any exem-

The invention claimed is:

1. A method of counteracting degradation of a fuel cell system of a heavy-duty vehicle, the method comprising:
   estimating, by a processor device of a computing system, standstill average power needs of the heavy-duty vehicle by estimating an average power that the heavy-duty vehicle will consume during a predetermined time period during which the heavy-duty vehicle will be at a standstill,
   determining, by the processor device, an idling power extractable from the fuel cell system,
   comparing, by the processor device, the idling power with said estimated standstill average power needs,
   determining, by the processor device, based on the comparison, a duration for which the fuel cell system should be kept turned on to fulfil said estimated standstill average power needs, and
   controlling, by the processor device, the fuel cell system to be kept turned on for the determined duration,
   wherein the estimation of the standstill average power needs is based on
   expected ambient conditions including expected outside temperature values, during said predetermined time period.

2. The method according to claim 1, wherein the heavy-duty vehicle comprises a battery pack having one or more batteries, the battery pack being chargeable by the fuel cell system, the method further comprising:
   determining, by the processor device, the state of charge of the battery pack,
   wherein said determining of the duration for which the fuel cell system should be kept turned on to fulfil said estimated standstill average power needs is also based on the determined state of charge of the battery pack.

3. The method according to claim 1, wherein, if, based on the comparison it is determined that:
   the idling power is lower than said estimated standstill average power needs, then the method further comprises controlling, by the processor device, the fuel cell system to run at a power level greater than the idling power so as to fulfil said estimated standstill average power needs,
   the idling power is higher than the estimated standstill average power needs of the heavy-duty vehicle, then the method further comprises controlling, by the processor device, the fuel cell system to be kept turned on at the idling power so as to fulfil said estimated standstill average power needs.

4. The method according to claim 2, wherein, if, based on the comparison it is determined that:
   the idling power is lower than said estimated standstill average power needs, then the method further comprises controlling, by the processor device, the fuel cell system to run at a power level greater than the idling power so as to fulfil said estimated standstill average power needs,
   the idling power is higher than the estimated standstill average power needs of the heavy-duty vehicle, then the method further comprises controlling, by the processor device, the fuel cell system to be kept turned on at the idling power so as to fulfil said estimated standstill average power needs,
   wherein if, based on the comparison, it is determined that the idling power is higher than the estimated standstill average power needs of the heavy-duty vehicle, then the method further comprises:
   calculating, by the processor device, an average excess power, the average excess power being the difference between the idling power and the estimated standstill average power needs, and
   determining, by the processor device, based on the state of charge and capacity of the battery pack, whether or not the calculated average excess power for the entire duration of said predetermined timed period can be used to charge the battery pack.

5. The method according to claim 4, wherein if it is determined that the calculated average excess power:
   can be used to charge the battery pack for the entire duration of said predetermined time period, then the method comprises controlling, by the processor device, the fuel cell system to be kept turned on at the idling power to fulfil the estimated standstill average power needs of the heavy-duty vehicle while charging the battery pack with said excess average power,
   cannot be used to charge the battery pack for the entire duration of said predetermined time period, then the method comprises determining, by the processor device, whether or not the current state of charge of the battery pack would be able to fulfil the estimated standstill average power needs of the heavy-duty vehicle for the entire duration of said predetermined time period.

6. The method according to claim 2, wherein if it is determined that the current state of charge of the battery pack:
   fulfils the estimated standstill average power needs of the heavy-duty vehicle for the entire duration of said predetermined time period, then the method comprises controlling, by the processor device, the fuel cell system to be turned off and controlling, by the processor device, the battery pack to provide the estimated standstill average power needs,
   does not fulfil the estimated standstill average power needs of the heavy-duty vehicle for the entire duration of said predetermined time period, then the method comprises determining, by the processor device, whether or not the battery pack would be able to fulfil the estimated standstill average power needs if it was fully charged.

7. The method according to claim 6, wherein if it is determined that:
   the battery pack would be able to fulfil the estimated standstill average power needs if it was fully charged, then the method comprises controlling, by the processor device, the fuel cell system to charge the battery pack fully and then controlling, by the processor device, the fuel cell system to be shut down,
   the battery pack would be unable to fulfil the estimated standstill average power needs if it was fully charged, then the method comprises calculating, by the processor device, a duration for which the fuel cell system needs to run and to what level the battery pack should be charged to fulfil the estimated standstill average power needs, and then controlling, by the processor device, the fuel cell system to run for the calculated duration to charge the battery pack to the calculated level and then controlling, by the processor device, the fuel cell system to be shut down.

8. The heavy-duty vehicle comprising the processor device to perform the method of claim 1.

9. A computer program comprising program code for performing, when executed by the processor device, the method of claim 1.

10. A non-transitory computer-readable storage medium comprising instructions, which when executed by the processor device, cause the processor device to perform the method of claim 1.

11. A control unit for counteracting degradation of the fuel cell system of the heavy-duty vehicle,
the control unit being configured to perform the method according to claim 1.

12. The method according to claim 1, wherein the estimation of the standstill average power needs is further based on:
expected power consumption of turned on auxiliary devices, during said predetermined time period,
historical data on power consumption of the auxiliary devices,
expected power consumption of one or more power take-off devices during said predetermined time period, or
historical data on power consumption of the one or more power take-off device.

* * * * *